United States Patent
Underwood, III (10) Patent No.: US 11,228,154 B2
(45) Date of Patent: Jan. 18, 2022

(54) FIBER POLARISATION SCRAMBLER

(71) Applicant: Nufern, East Granby, CT (US)

(72) Inventor: Mitchell Underwood, III, Hamden, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 16/849,665

(22) Filed: Apr. 15, 2020

(65) Prior Publication Data

US 2020/0335928 A1    Oct. 22, 2020

Related U.S. Application Data

(60) Provisional application No. 62/835,388, filed on Apr. 17, 2019.

(51) Int. Cl.
| | |
|---|---|
| *H01S 3/067* | (2006.01) |
| *H01S 3/08* | (2006.01) |
| *H01S 3/23* | (2006.01) |

(52) U.S. Cl.
CPC ...... *H01S 3/06712* (2013.01); *H01S 3/06783* (2013.01); *H01S 3/08036* (2013.01); *H01S 3/2308* (2013.01)

(58) Field of Classification Search
CPC ............. H01S 3/06712; H01S 3/06783; H01S 3/08036; H01S 3/005; H01S 3/2308
See application file for complete search history.

(56) References Cited

U.S. PATENT DOCUMENTS

| | | | | |
|---|---|---|---|---|
| 4,245,800 A * | 1/1981 | Henderson | .............. | F41G 7/263 244/3.13 |
| 5,457,756 A | 10/1995 | Hartl et al. | | |
| 5,473,457 A * | 12/1995 | Ono | ........................ | G02B 6/278 385/11 |
| 2003/0063833 A1* | 4/2003 | Gonthier | ................ | G02B 6/274 385/11 |

FOREIGN PATENT DOCUMENTS

WO    2018/100579 A1    6/2018

OTHER PUBLICATIONS

International Search Report and written Opinion received for PCT Patent Application No. PCT/US2020/028333, dated Jul. 23, 2020, 11 pages.

(Continued)

*Primary Examiner* — Xinning (Tom) Niu
(74) *Attorney, Agent, or Firm* — Morrison & Foerster LLP (57) ABSTRACT

An optical apparatus for depolarizing a laser beam within a fiber MOPA laser is disclosed. The apparatus includes a first phase modulator for spectral broadening, a linear polarizer, an optical coupler, a second phase modulator for depolarizing the laser beam, and a polarization-maintaining optical fiber. The optical coupler divides a linearly-polarized portion of the laser beam equally between fast and slow axes of the second phase modulator. The laser beam delivered by the polarization-maintaining optical fiber is truly unpolarized. The apparatus provides independent control of the spectral broadening and the depolarization to mitigate stimulated Brillouin scattering during subsequent amplification. A method for depolarizing a laser beam, using this apparatus, is also disclosed.

20 Claims, 5 Drawing Sheets

(56) References Cited

OTHER PUBLICATIONS

Phoenix Photonics, Technical Brief #2, Depolarizers, 2003, pp. 1-5.
Bohm et al., "Performance of Lyot Depolarizers with Birefringent Single-Mode Fibers", Journal of Lightwave Technology, vol. 1, No. 1, Mar. 1983, pp. 71-74.
Burns Williamk., "Degree of Polarization in the Lyot Depolarizer", Journal of Lightwave Technology, vol. 1, No. 1, Sep. 1983, pp. 475-479.
Ferreira et al., "Combined FEC/ SOP Scrambling with Delay Line PMD Mitigation Scheme", Optical Fiber Communication and Optoelectronics Conference, Oct. 1, 2007, pp. 442-444.
Kang et al., "Suppression of the Polarization Dependence of Fiber Bragg Grating Interrogation Based on a Wavelength-Swept Fiber Laser", Smart Materials and Structures, vol. 15, 2006, pp. 435-440.
Karaki et al., "First and Second-Order PMD Impact Over 100 Gbps Polarisation-Multiplexed Multi-Band Coherent OFDM System Under Realistic Field Conditions", Photonics Conference, Oct. 9, 2011, pp. 831-832.
Nayak et al., "Design, Fabrication and Testing of High Performance Fiber Optic Depolarizer", retrieved on Aug. 4, 2020, 6 pages.
Shimotsu et al., "Stabilized 20 GHz LiNbO3 Polarization Scrambler", Engineering & Laboratory Notes, vol. 8, No. 1997, 2 pages.

\* cited by examiner

FIBER POLARISATION SCRAMBLER

PRIORITY

This application claims priority to U.S. Provisional Patent Application Ser. No. 62/835,388 filed on 17 Apr. 2019, the disclosure of which is incorporated herein by reference in its entirety.

TECHNICAL FIELD OF THE INVENTION

The present invention relates in general to master-oscillator power-amplifier (MOPA) laser systems. The invention relates in particular to depolarizing a laser beam prior to amplification in fiber MOPA laser systems.

DISCUSSION OF BACKGROUND ART

A common architecture for a high-power fiber laser is to have a low-power master oscillator providing "seed" laser radiation, which is amplified by one or more fiber preamplifiers, then further amplified by a power amplifier. Such fiber MOPA lasers can deliver output laser radiation having a power greater than 2 kilowatts (kW) in a single longitudinal mode (SLM). Gain is provided by an optically-active ion, such as neodymium ($Nd^{3+}$), ytterbium ($Yb^{3+}$), thulium ($Tm^{3+}$), or erbium ($Er^{3+}$), doped into the cores of the amplifier fibers. The optically-active ion is selected to provide the desired output wavelength. For example, neodymium and ytterbium ions provide gain at near-infrared wavelengths between about 1.0 micrometers ($\mu m$) and 1.1 $\mu m$.

For laser radiation having a narrow spectral bandwidth and a long temporal coherence, stimulated Brillouin scattering (SBS) can cause back reflections that reduce efficiency and ultimately limit the output power that can be obtained from an amplifier. Such back reflections can permanently damage the fiber laser and render it inoperative. One technique for suppressing SBS is to spectrally broaden the laser radiation before it seeds an amplifier. For example, by propagating the laser radiation through an optical phase modulator driven by a radio-frequency (RF) electrical signal.

However, output laser radiation having a narrow spectral bandwidth is often required, which limits the amount of spectral broadening that can be applied to the laser radiation prior to amplification. For example, when spectrally combining the output radiation from multiple fiber MOPA lasers to further scale the output power. Another technique for suppressing SBS is to seed the amplifiers with laser radiation that lacks a well-defined optical polarization. Such radiation may be referred to as "unpolarized" or "polarization scrambled."

It is important to distinguish between "unpolarized" radiation and the more common "random polarized" radiation, produced by fiber lasers that do not deliberately maintain a defined linear polarization. Such "random polarized" radiation typically has a "high-degree of polarization" and only drifts slowly over the Poincaré sphere, so it is possible to recover stable linearly-polarized radiation using polarization-rotating optics. In contrast, "unpolarized" radiation has a rapidly fluctuating polarization due to random and uncorrelated phase fluctuations along orthogonal Cartesian components of the electric field. Although it may be theoretically possible to recover a stable linear polarization, using polarization-rotating optics in a fast feedback loop, it is not possible practically.

An additional problem when scaling fiber MOPA lasers to high output powers is spectral broadening by self-phase modulation (SPM), which can occur when intense laser radiation is confined within the core of an optical fiber, due to the nonlinear Kerr effect. Rapid intensity fluctuations in the laser radiation modulate the refractive index, which in turn modulates the phase of the laser radiation, thereby increasing the spectral bandwidth. When unpolarized laser radiation is delivered to a power amplifier having incidental polarization-dependent gain or loss, rapid intensity fluctuations and therefore undesirable spectral broadening can be produced.

There is need for an optical device that scrambles the polarization of laser radiation for amplification in a fiber MOPA laser, without producing SPM and excessive spectral broadening. The optical device should introduce minimal losses, while providing truly unpolarized laser radiation that traverses the Poincaré sphere at a sufficiently high rate to prevent SBS. Preferably, the optical device would add minimal optical components, complexity, and cost to the fiber MOPA laser.

SUMMARY OF THE INVENTION

In one aspect, an optical apparatus for depolarizing a laser beam in accordance with the present invention comprises a linear polarizer, which receives the laser beam and transmits a portion thereof that is linearly polarized, and a polarization-scrambling phase modulator having fast and slow axes. An optical coupler receives the linearly-polarized laser beam, divides the linearly-polarized laser beam into two polarization components having equal power, and separately delivers the two polarization components to the fast and slow axes of the polarization-scrambling phase modulator. A birefringent element has fast and slow axes. The polarization component in the slow axis of the polarization-scrambling phase modulator is coupled into the fast axis of the birefringent element. The polarization component in the fast axis of the polarization-scrambling phase modulator is coupled into the slow axis of the birefringent element. The polarization-scrambling phase modulator produces a differential phase modulation and a time delay between the two polarization components therein. The birefringent element has a length selected to compensate for the time delay.

In another aspect, a method for depolarizing a laser beam in accordance with the present invention comprises transmitting a portion of the laser beam that is linearly polarized through a linear polarizer. The linearly-polarized laser beam is divided into two polarization components having equal power. The polarization components are delivered into different axes of a polarization-scrambling phase modulator having fast and slow axes. The polarization-scrambling phase modulator is driven with a random rapidly-modulated electrical signal that preferentially modulates one of the polarization components, thereby producing a random differential phase modulation between the polarization components. The polarization component in the slow axis of the polarization-scrambling phase modulator is coupled into a fast axis of a birefringent element. The polarization component in the fast axis of the polarization-scrambling phase modulator is coupled into a slow axis of the birefringent element. The polarization-scrambling phase modulator produces a time delay between the two polarization components therein. The birefringent element has a length selected to compensate for the time delay.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
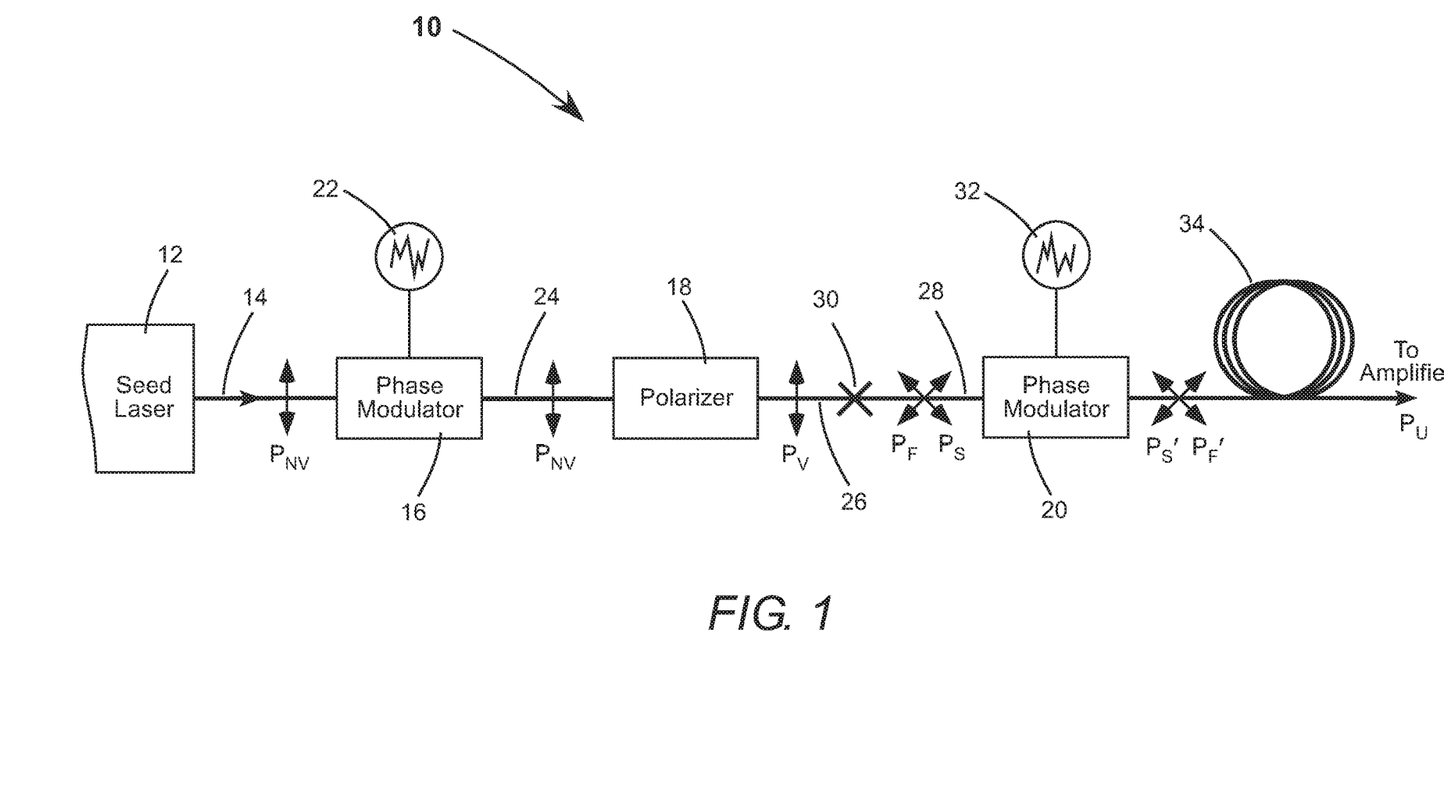
FIG. 1 is a block diagram schematically illustrating one preferred embodiment of optical apparatus in accordance with the present invention for depolarizing a laser beam, including (in order) a first phase modulator, a linear polarizer, two serial polarization-maintaining optical fibers joined by a crossed splice, a second phase modulator, and a polarization-maintaining optical fiber.

Referring now to the drawings, wherein like components are designated by like numerals, FIG. 1 is a block diagram schematically illustrating one preferred embodiment 10 of optical apparatus in accordance with the present invention to depolarize a laser beam provided by a seed laser 12. Seed laser 12 may be a master oscillator or a master oscillator combined with one or more preamplifiers. The laser beam is delivered to optical apparatus 10 through a polarization-maintaining optical fiber 14. The laser beam is nominally polarized; here, having some degree of vertical linear polarization $P_{NV}$, by way of example. The laser beam delivered through optical fiber 14 also has an initial spectral bandwidth.

Optical apparatus 10 includes an optional first phase modulator 16, a linear polarizer 18, and a second phase modulator 20. A birefringent electro-optic crystal inside first phase modulator 16 is driven by a rapidly-modulated electrical signal from a source 22 thereof. For example, a lithium niobate (LiNbO$_3$) crystal that is driven by a white-noise signal or other randomly-modulated signal. The refractive index of the electro-optic crystal is rapidly-modulated through the electro-optic effect, imparting a phase modulation on the laser beam and thereby increasing its spectral bandwidth. The birefringent axes of optical fiber 14 are aligned to the principal axes of the birefringent electro-optic crystal to maximize modulation efficiency.

Optional first phase modulator 16 increases the spectral bandwidth of the laser beam from the initial spectral bandwidth to a desired spectral bandwidth. For example, for spectrally combining output beams from a plurality of MOPA lasers, the desired spectral bandwidth would be slightly less than a maximum acceptance bandwidth of a spectral-combining element. This is the maximum spectral broadening that could be applied to increase the SBS threshold for further amplification, without introducing a power loss when spectral combining. Suitable fiber-coupled phase modulators are commercially available. For example, from EOSPACE Inc. of Redmond, Wash. Modulation frequencies greater than 40 GHz are achievable using commercial phase modulators.

The laser beam is delivered from first phase modulator 16 to polarizer 18 by a polarization-maintaining optical fiber 24. The principal axes of first phase modulator 16, the birefringent axes of optical fiber 24, and the optical axes of polarizer 18 are mutually aligned to minimize power losses. A laser beam from a seed laser is usually linearly polarized, to some degree, even when linear polarization is not deliberately maintained. Polarizer 18 transmits a portion of the spectrally-broadened laser beam that is linearly polarized, thereby increasing the degree of linear polarization, preferably to greater than 95% and more-preferably to greater than 98%. Here, the vertical linear polarization $P_V$ is transmitted. Polarizer 18 may be a fiber polarizer that blocks or separates the orthogonal linear polarization. For example, an in-line fiber polarizer, commercially available from ThorLabs Inc. of Newton, N.J. Polarization extinction ratios greater than 20 dB are common in commercial linear polarizers.

The laser beam is delivered from polarizer 18 to second phase modulator 20 through a polarization-maintaining optical fiber 26 and a polarization-maintaining optical fiber 28, which are joined together by a splice 30. Orthogonal birefringent axes of optical fiber 26 and optical fiber 28 are oriented at 45° with respect to each other at splice 30, which divides the linearly-polarized laser beam from optical fiber 26 into polarization components having equal power in birefringent axes of optical fiber 28. The birefringent axes of optical fiber 28 and principal axes of second phase modulator 20 are aligned, so the polarization components in the fast and slow principal axes of the birefringent electro-optic crystal inside the second phase modulator have approximately equal power. The linear polarization extinction ratio is reduced to zero between fast-axis polarization $P_F$ and slow-axis polarization $P_S$ of second phase modulator 20.

Second phase modulator 20 is driven by a rapidly-modulated electrical signal from source 32. Second phase modulator 20 preferentially modulates one polarization, producing a differential phase modulation, having a magnitude that depends on the particular orientation of the crystal. The rapid modulation in the electrical signal is random and imparts a random phase modulation. Source 32 is preferably a white-noise source, providing an electrical signal having an approximately constant power density over an extended spectral bandwidth. The random differential phase modulation between fast-axis polarization $P_F$ and slow-axis polarization $P_S$ in the second phase modulator scrambles the overall polarization, producing an unpolarized laser beam.

In addition, slow-axis polarization $P_S$ emerges delayed with respect to fast-axis polarization $P_F$, due to the birefringence of the electro-optic crystal, with a time delay that is comparable to or greater than the coherence time of the spectrally-broadened laser beam. This time delay produces additional polarization scrambling, due to the uncorrelated phase fluctuations of the two polarization components. However, the time delay could also produce very rapid intensity fluctuations and therefore undesirable SPM-induced spectral broadening in a subsequent amplifier having any incidental polarization-dependent gain or loss, as discussed above. Therefore, overall, the time delay is undesirable.

This time delay is eliminated by delivering the depolarized laser beam from second phase modulator 20 to subsequent amplifiers through a polarization-maintaining optical fiber 34. Slow-axis polarization $P_S$ component from second phase modulator 20 is coupled into fast-axis polarization $P_F'$ of optical fiber 34 and fast-axis polarization $P_F$ component from the second phase modulator is coupled into slow-axis polarization $P_S'$ of the optical fiber. Optical fiber 34 has a length selected such that the time difference for the two polarization components to propagate therethrough, due to the birefringence thereof, approximately compensates the time delay caused by second phase modulator 20. Therefore, there is negligible contribution to the overall polarization scrambling by the birefringence of second phase modulator 20 itself. The polarization scrambling is due only to the random differential phase modulation and therefore can be controlled directly through the electrical signal provided by source 32.

Polarization-maintaining optical fiber 34 is convenient for both providing a compensating time delay and delivering the depolarized laser beam to subsequent amplifiers. However, optical fiber 34 can be characterized as a birefringent element, which could be replaced with a different birefringent element. For example, with a birefringent crystal. The slow and fast axes of second phase modulator 20 would be optically coupled, respectively, to the fast and slow axes of the birefringent element. The length of the birefringent element would be selected to compensate for the time delay caused by the second phase modulator. By way of example, the birefringent element could be another phase modulator identical to second phase modulator 20 or just the electro-optic crystal thereof, with the polarization axes of the electro-optic crystals mutually oriented at 90°. Driving another identical phase modulator with another random rapidly-modulated electrical signal would enable differential phase modulations to be imparted on both polarization components, which has an advantage that any incidental differential spectral broadening could be compensated. In some spectral-combining applications, it is desirable to have the same spectral bandwidth for both polarization components.

The two polarization components form a laser beam that is truly unpolarized Pu after traversing the birefringent element. The unpolarized laser beam could be coupled into an optical fiber that is not polarization maintaining or delivered to a subsequent amplifier that does not have birefringence. For example, a fiber power amplifier having a non-polarization-maintaining gain fiber and generating an amplified laser beam.

The highest-frequency in the electrical signal from source 32 applied to second phase modulator 20 is lower than the highest-frequency from source 22 applied to first phase modulator 16. For example, first phase modulator 16 is driven over a spectral bandwidth between 10 megahertz (MHz) and 10 gigahertz (GHz), which broadens the bandwidth of the laser beam to a desired bandwidth greater than 10 GHz, thereby reducing the coherence time and suppressing SBS. Second phase modulator 20 is driven over an exemplary spectral bandwidth between 10 MHz and 500 MHz, providing polarization scrambling at a rate higher than 500 MHz, with minimal additional spectral broadening. The first phase modulator is a spectral-broadening phase modulator and the second phase modulator is a polarization-scrambling phase modulator. The frequency spectrum of the electrical signal applied to the polarization-scrambling phase modulator can be empirically optimized for any particular amplifier arrangement to provide maximum SBS suppression with minimal additional spectral broadening. The spectral-broadening phase modulator can be omitted if the laser beam from seed laser 12 already has sufficient spectral bandwidth.

An example of optical apparatus 10 of FIG. 1 was built and tested. Seed laser 12 generated a continuous-wave laser beam having a narrow-spectral-bandwidth, on the order of hundreds of kilohertz, and a peak wavelength of about 1064 nanometers. Source 22 provided a white-noise drive signal over a bandwidth between 10 MHz and 9 GHz, which spectrally broadened the laser beam to 27 GHz for SBS suppression. Source 32 provided a white-noise drive signal over a bandwidth between 10 MHz and 400 MHz to drive second phase modulator 20 and depolarize the spectrally-broadened laser beam. The unpolarized laser beam from optical fiber 34 was analyzed using a polarizing beam splitter, a fast photodetector, and an RF spectrum analyzer. The rate of polarization scrambling, which corresponds to the rate the electric-field traverses the Poincaré sphere, was measured to be about 1 GHz. It should be noted that a 1 GHz rate can be achieved while driving second phase modulator 20 with a 400 MHz bandwidth signal, because phase modulation with large phase deviations can produce spectral content at frequencies that exceed the modulation rate. Such high-frequency content corresponds to, for example, higher-order terms in a Jacobi-Anger expansion.

Figure 2:
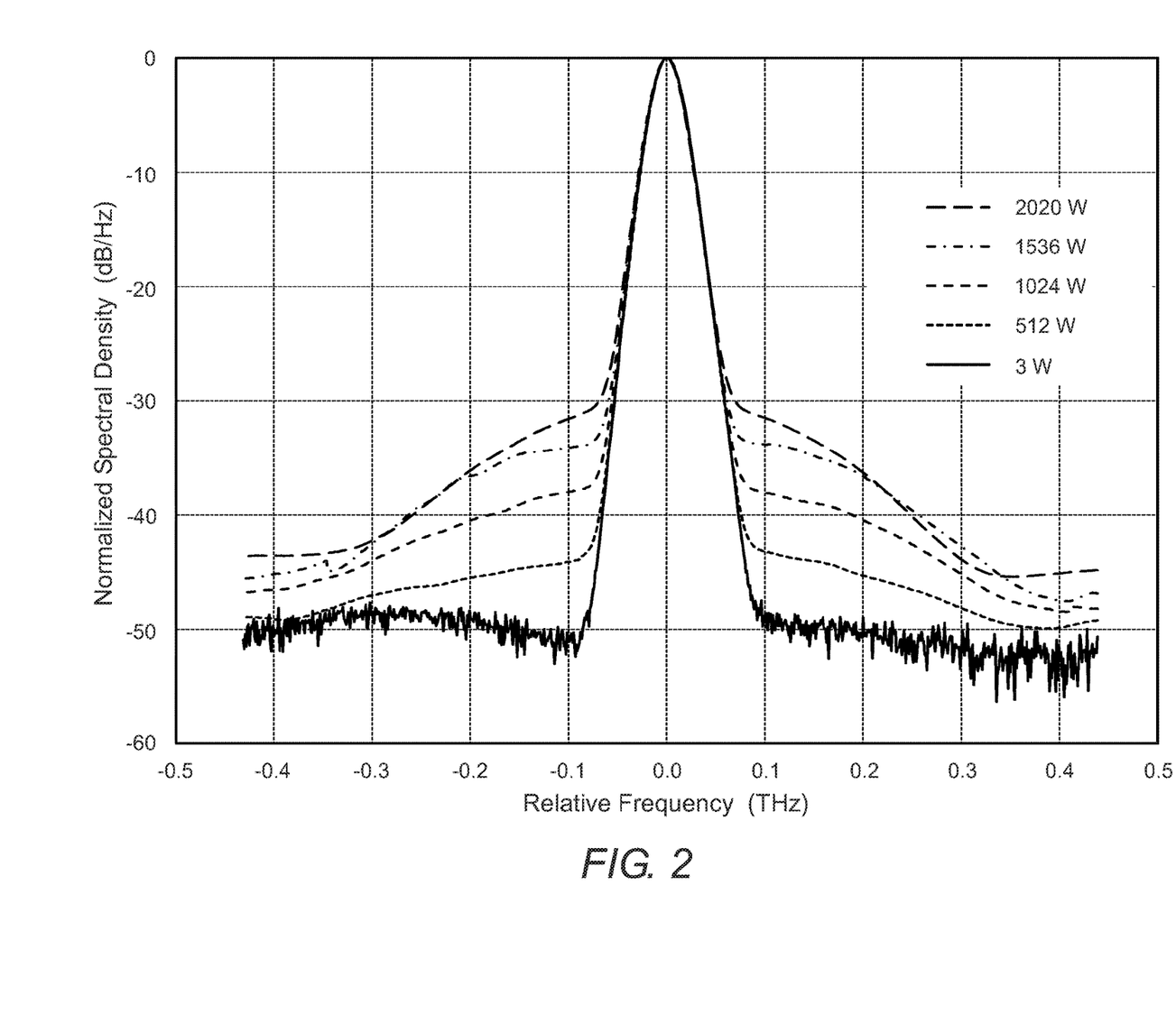
FIG. 2 is a graph schematically illustrating normalized spectral density vs. relative frequency for an amplified laser beam from a fiber power-amplifier that was seeded with a depolarized laser beam from an example of the optical apparatus in FIG. 1.

The unpolarized laser beam from optical fiber 34 was preamplified to a power of a few watts (W), then further amplified by a fiber power-amplifier. FIG. 2 is a graph schematically illustrating normalized spectral density vs. frequency for the amplified laser beam at different output powers, obtained by pumping the gain fiber in the power amplifier at different powers. The amplified output powers were 512 W, 1024 W, 1536 W, and 2020 W, as indicated on the drawing. The preamplified laser beam (3 W) is also included for comparison. The spectral bandwidth of the preamplified laser beam at −3 dB was about 27 GHz and it remained about 27 GHz for all amplified output powers. All the spectra are essentially the same above about −30 dB. Below about −30 dB, there is a shoulder produced by amplified spontaneous emission (ASE). Power-dependent ASE is produced by all fiber amplifiers and is not related to the inventive polarization scrambling.

Figure 3A:
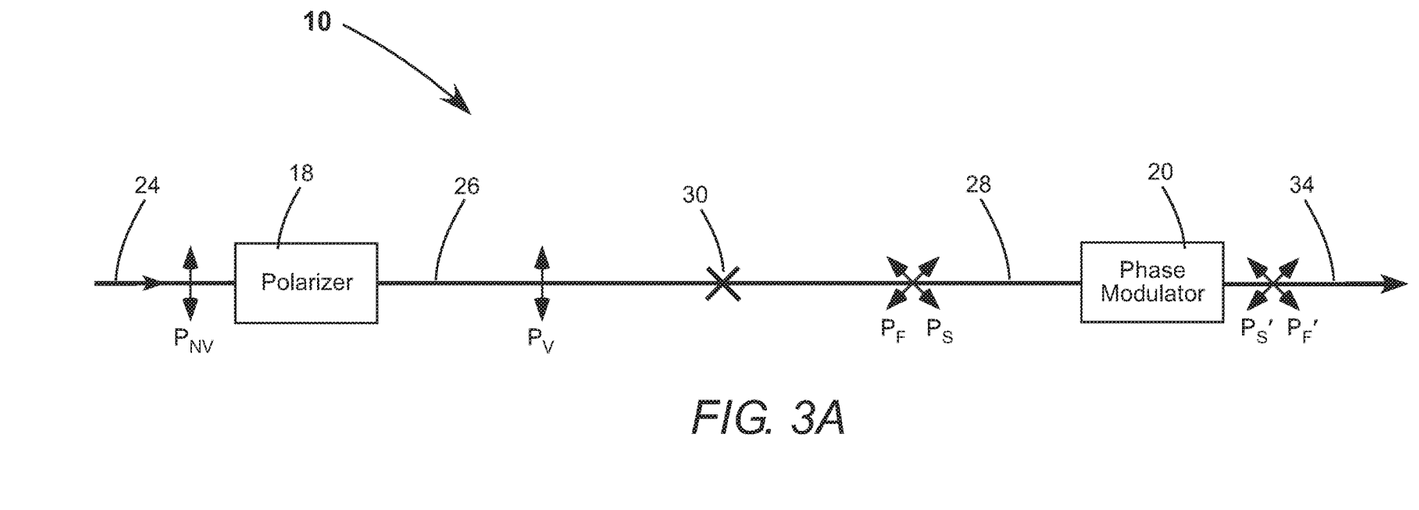
FIG. 3A is a block diagram schematically illustrating the serial polarization-maintaining optical fibers joined by the crossed splice of the optical apparatus in FIG. 1, which together form an optical coupler.

FIG. 3A is a block diagram schematically illustrating the elements of optical apparatus 10 of FIG. 1 located between optical fiber 24 and optical fiber 34. Sources 22 and 32 have been omitted from the drawing for clarity of illustration. Optical fiber 26 in series with optical fiber 28, joined together at crossed splice 30, are an optical coupler that divides the linearly-polarized laser beam from polarizer 18 into two polarization components having about equal power in the fast and slow axes of second phase modulator 20.

Figure 3B:
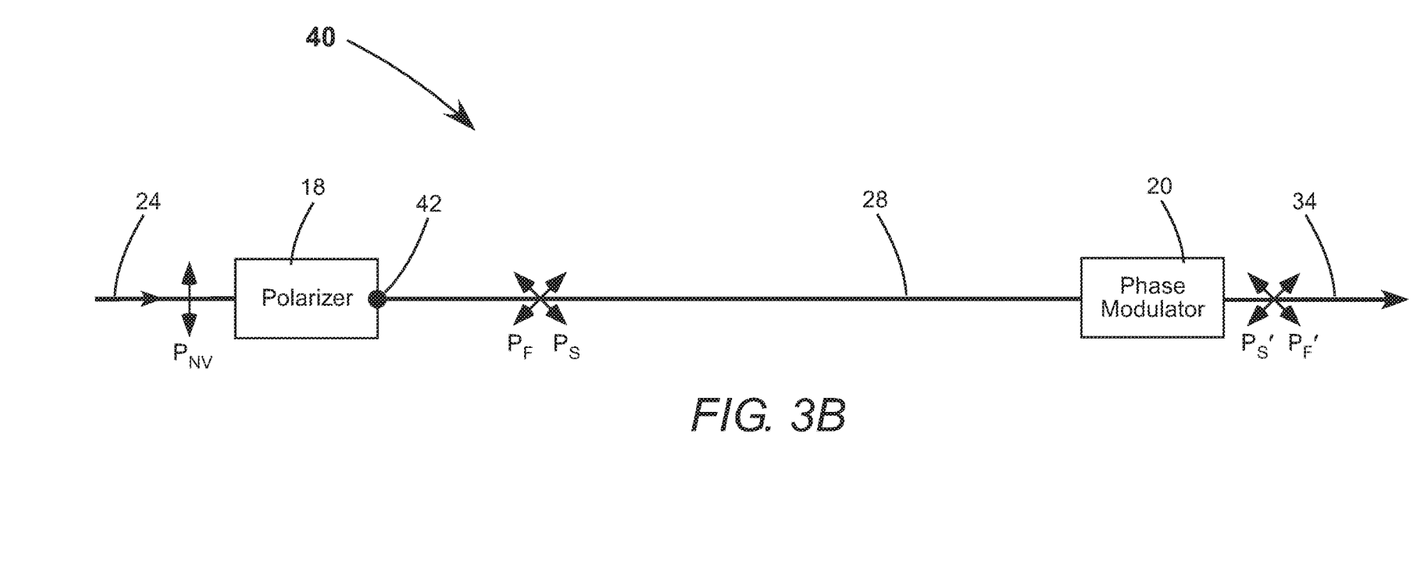
FIG. 3B is a block diagram schematically illustrating another optical apparatus for depolarizing a laser beam in accordance with the present invention, which is similar to the embodiment of FIG. 3A, but includes a polarization-maintaining optical fiber and a connection located at the end thereof proximate to the linear polarizer, which together form an optical coupler.

FIG. 3A can be compared to FIG. 3B, which is a block diagram schematically illustrating another preferred embodiment 40 of optical apparatus in accordance with the present invention to depolarize a laser beam. Optical apparatus 40 is similar to optical apparatus 10, but omits optical fiber 26 and splice 30. The optical coupler in optical apparatus 40 is a connection 42 and optical fiber 28. Connection 42 is located at the end of optical fiber 28 that is proximate to polarizer 18 and connects the linearly-polarized laser beam from the polarizer to the optical fiber. For example, connection 42 could be a focusing lens incorporated into an assembly that includes polarizer 18. The orthogonal birefringent axes of optical fiber 28 are oriented at 45° with respect to the optical axes of polarizer 18, thereby dividing the linearly-polarized laser beam into polarization components having equal power in the birefringent axes of optical fiber 28. The birefringent axes of optical fiber 28 and the principal axes of second phase modulator 20 are aligned, therefore the fast and slow polarizations in the second phase modulator also have about equal power.

Figure 3C:
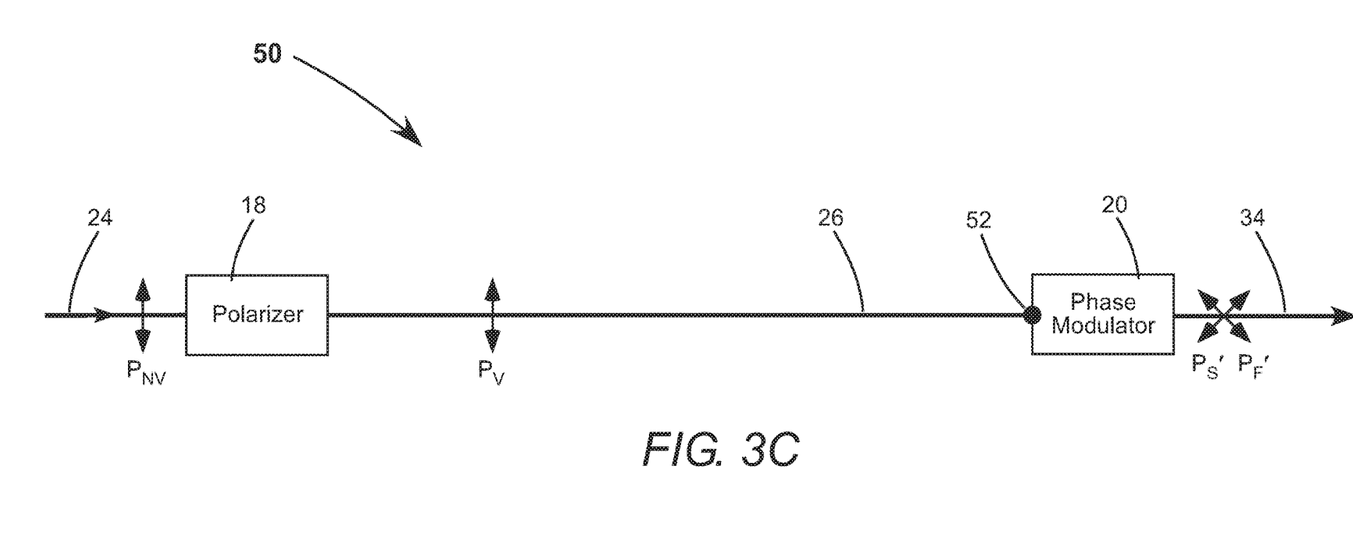
FIG. 3C is a block diagram schematically illustrating yet another optical apparatus for depolarizing a laser beam in accordance with the present invention, which is similar to the embodiment of FIG. 3A, but includes a polarization-maintaining optical fiber and a connection located at the end thereof proximate to the second phase modulator, which together form an optical coupler.

FIG. 3C is a block diagram schematically illustrating yet another preferred embodiment 50 of optical apparatus in accordance with the present invention to depolarize a laser beam. Optical apparatus 50 is similar to optical apparatus 10, but omits optical fiber 28 and splice 30. The optical coupler in optical apparatus 50 is a connection 52 and optical fiber 26. Connection 52 is located at the end of optical fiber 26 that is proximate to second phase modulator 20 and connects the linearly-polarized laser beam in the optical fiber to the second phase modulator. For example, connection 52 could be a collimating lens, in an assembly that also includes second phase modulator 20. The orthogonal birefringent axes of optical fiber 26 are oriented at 45° with respect to the principal axes of second phase modulator 20, thereby dividing the linearly-polarized laser beam into two polarization components having about equal power in the fast and slow axes of the second phase modulator.

FIGS. 3A-3C together illustrate that elements of the inventive optical apparatus can be integrated together in different combinations. Optical apparatus 10 of FIG. 3A has an advantage that commercially-available fiber components, such as polarizer 18 and second phase modulator 20, have fiber pigtails or fiber connectors. It is straight-forward to join separate fiber components by splicing. For example, forming splice 30 using an automated fusion splicer. However, polarizer 18, second phase modulator 20, and neighboring elements can be integrated into functionally equivalent assemblies, without departing from the spirit and scope of the present invention. The linearly-polarized laser beam from the polarizer could even be coupled into the second phase modulator through non-fiber free-space optics, including polarization rotation optics, if needed.

Figure 3D:
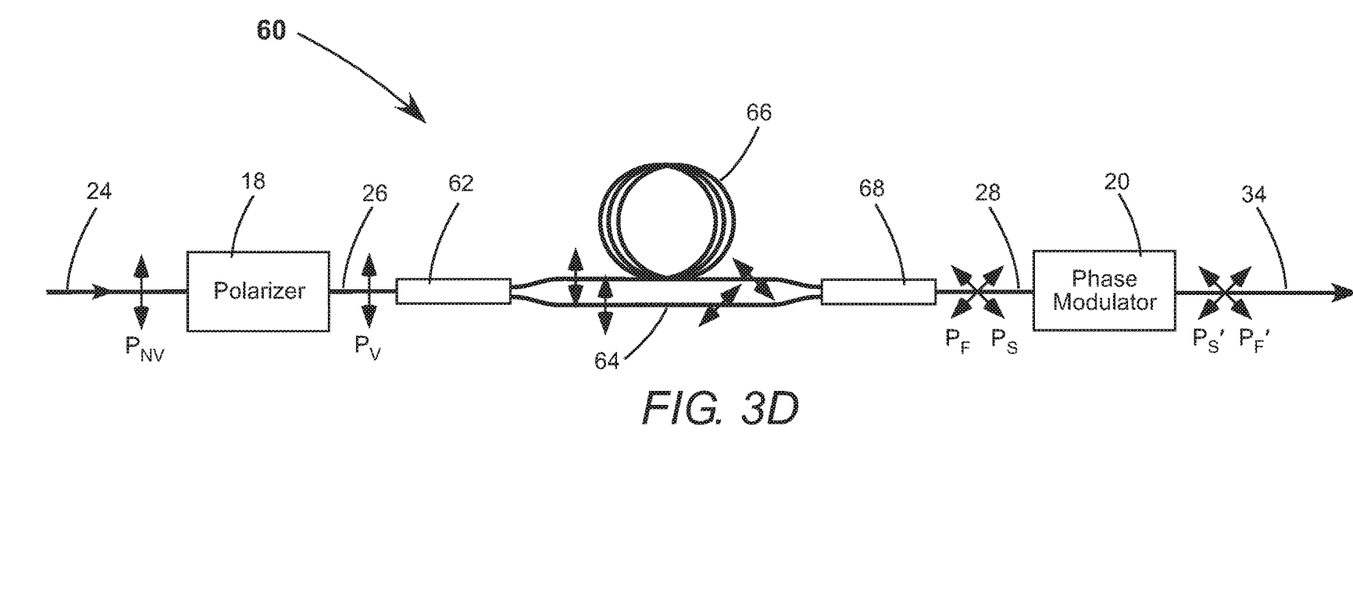
FIG. 3D is a block diagram schematically illustrating still another optical apparatus for depolarizing a laser beam in accordance with the present invention, which is similar to the embodiment of FIG. 3A, but includes a polarization-maintaining beam splitter, a short polarization-maintaining optical fiber in parallel with a long polarization-maintaining optical fiber, and a polarization combiner, which together form an optical coupler.

A possible disadvantage of optical apparatus 10 of FIG. 3A is that splice 30, which is crossed at 45°, may be susceptible to mechanical and thermal stresses. Stress on splice 30 could cause coupling between the two polarization components and an unequal division of the linearly-polarized laser beam into the birefringent axes of optical fiber 28. FIG. 3D is a block diagram schematically illustrating still another preferred embodiment 60 of optical apparatus in accordance with the present invention to depolarize a laser beam, which does not include crossed polarization-maintaining optical fibers that are spliced together.

Optical apparatus 60 includes a polarization-maintaining beam splitter 62, a short polarization-maintaining optical fiber 64, a long polarization-maintaining optical fiber 66, and a polarization combiner 68. Polarization-maintaining 50:50 beam splitters and polarization combiners are commercially available as catalog fiber components. Beam splitter 62 separates the linearly-polarized laser beam into two laser beams having equal power and the same polarization, which is here the vertical linear polarization $P_V$. Polarization combiner 68 and optical fiber 28 couple one beam into the fast axis and the other beam into the slow axis of second phase modulator 20. The long and short fibers can be twisted, if necessary, to accomplish this coupling. Beam splitter 62, short optical fiber 64 in parallel with long optical fiber 66, and polarization combiner 68 together are an optical coupler between polarizer 18 and second phase modulator 20.

The length difference between short optical fiber 64 and long optical fiber 66 produces a first relative time delay $\Delta T_1$ between the two laser beams. If $\Delta T_1$ is less than the coherence time of the linearly-polarized laser beam, optical apparatus 60 just has the advantage of not including crossed and spliced polarization-maintaining optical fibers. If $\Delta T_1$ is longer than the coherence time of the linearly-polarized laser beam, optical apparatus 60 has another advantage of eliminating mutual coherence of the two polarization components and thus reducing any coupling between these polarization components caused by stresses after they are recombined.

If relative time delay $\Delta T_1$ is longer than the coherence time, the laser beam in optical fiber 28 will already be depolarized due to uncorrelated phase fluctuations of the two polarization components. However, such a relative time delay $\Delta T_1$ can also cause very rapid intensity fluctuations that induce undesirable spectral broadening, as discussed above and further below. The birefringent axes of optical fiber 28 and the principal axes of second phase modulator 20 are aligned. The slow-axis polarization is delayed with respect to the fast-axis polarization within second phase modulator 20, introducing a second relative time delay $\Delta T_2$, as discussed above. Relative time delays $\Delta T_1$ and $\Delta T_2$ may be mutually additive or subtractive, depending on the polarity of short optical fiber 64 and long optical fiber 66 coupled into the fast and slow axes of the second phase modulator. The length of optical fiber 34 is selected to compensate for the overall relative time delay $\Delta T_1 \pm \Delta T_2$ and prevent spectral broadening.

It is useful to define "unpolarized" radiation formally. The electric field is a vector quantity that may have components in one or more directions. The electric field is always polarized in a direction defined by the vector sum of its components in an arbitrary choice of basis. For example, an electric field E may have components $E_x$ and $E_y$ in the Cartesian basis. The electric field can be expressed in vector notation:

$$\vec{E} = \begin{pmatrix} E_x \\ E_y \end{pmatrix}. \tag{1}$$

At any instant, the electric field E has a defined magnitude and direction, meaning the electric field is always instantaneously polarized. There is no combination of $E_x$ and $E_y$ that produces an electric field without a defined direction, except for the trivial case of no electric field, when $E_x = E_y = 0$. "Unpolarized" radiation, therefore, refers not to an instantaneous polarization of the electric field, but rather to a time-averaged polarization direction of the electric-field vector $\vec{E}$. By suitable modulation of the components $E_x$ and $E_y$, it is possible to produce a rapidly fluctuating instantaneous polarization, having an approximately uniform probability density over a range of spatial directions. A time-averaged sample of the electric field $\vec{E}$ is "unpolarized," since no particular direction of the electric-field vector $\vec{E}$ within that range is more likely than any other.

To model one example of such unpolarized radiation, components $E_x$ and $E_y$ can be expanded and written explicitly in terms of their amplitudes and phases:

$$\vec{E} = \begin{pmatrix} |E_x| \exp\ [i(\omega t + \phi_x(t))] \\ |E_y| \exp\ [i(\omega t + \phi_y(t))] \end{pmatrix}. \quad (2)$$

It is assumed that components $E_x$ and $E_y$ in Equation (2) have the same magnitudes $|E_x|=|E_y|=E/\sqrt{2}$, otherwise there would be some average polarization, and that these magnitudes have no time dependence. It is also assumed that components $E_x$ and $E_y$ have the same frequency ω, but different time-dependent phases $\phi_x(t)$ and $\phi_y$ (t). These phases can be expressed in terms of a common phase $\phi_c(t)$ and a differential phase $\phi_d(t)$, without loss of generality:

$$\phi_x(t) = \phi_c(t)$$

$$\phi_y(t) = \phi_c(t) + \phi_d(t). \quad (3)$$

The inventive optical apparatus provides independent control over the common phase and the differential phase. The common phase is modulated by first phase modulator 16 and the differential phase is modulated by second phase modulator 20. If the differential phase $\phi_d(t)$ has a smaller amplitude or bandwidth than the common phase $\phi_c(t)$, the polarization of the radiation can be controlled through the differential phase and the spectral bandwidth can be independently controlled through the common phase. The spectral bandwidth is controlled by the electrical signal applied to the first phase modulator and the rate of depolarization is controlled by the electrical signal applied to the second phase modulator.

Referring again to FIG. 3D, it is insightful to analyze the electric-field and intensity the laser beam would have after polarization combiner 68 and before second phase modulator 20. For this analysis, the electric field $\vec{E}_C$ after the polarization combiner is passed through a theoretical linear polarizer that is oriented at 45° with respect to the mutually-orthogonal components of electric field $\vec{E}_C$. The polarization components are labeled, here, "short" and "long" corresponding to the two pathways between beam splitter 62 and polarization combiner 68. The electric field $\vec{E}_A$ after the theoretical linear polarizer is:

$$\vec{E}_A = \vec{E}_C \cdot \begin{pmatrix} \cos(45°) \\ \sin(45°) \end{pmatrix} \quad (4)$$

$$= \begin{pmatrix} \frac{E_C}{\sqrt{2}} \exp\ [i(\omega t + \phi_S(t))] \\ \frac{E_C}{\sqrt{2}} \exp\ [i(\omega t + \phi_L(t))] \end{pmatrix} \cdot \begin{pmatrix} \frac{1}{\sqrt{2}} \\ \frac{1}{\sqrt{2}} \end{pmatrix}$$

$$= \frac{E_C}{2} \exp\ [i\omega t](e^{i\phi_S(t)} + e^{i\phi_L(t)}).$$

The intensity of laser beam $I_A$ (t), which could be monitored using a photodetector, is proportional to the magnitude of the electric field squared:

$$I_A(t) \propto |\vec{E}_A|^2 \quad (5)$$

$$= \frac{E_C^2}{4}(e^{i\phi_S(t)} + e^{i\phi_L(t)})(e^{-i\phi_S(t)} + e^{-i\phi_L(t)})$$

$$= \frac{E_C^2}{4}(1 + e^{i(\phi_S(t)-\phi_L(t))} + e^{-i(\phi_S(t)-\phi_L(t))} + 1)$$

$$= \frac{E_C^2}{2}(1 + \cos(\phi_S(t) - \phi_L(t))).$$

The length difference between short optical fiber 64 and long optical fiber 66 means $\phi_S(t) \neq \phi_L$ (t), therefore there will be time-dependent intensity fluctuations in the recombined beam $I_A(t)$ if the first relative time delay $\Delta T_1$ is longer than the coherence time of the linearly-polarized laser beam. The intensity fluctuations are very rapid and correspond to unpolarized radiation as defined above. However, they are so rapid that they can produce significant spectral broadening, hence the need to compensate for the relative time delays in optical apparatus 60. The inventive optical apparatus having second phase modulator 20 and optical fiber 34 provides a desired phase modulation to mitigate SBS without undesirable spectral broadening.

Figure 4:
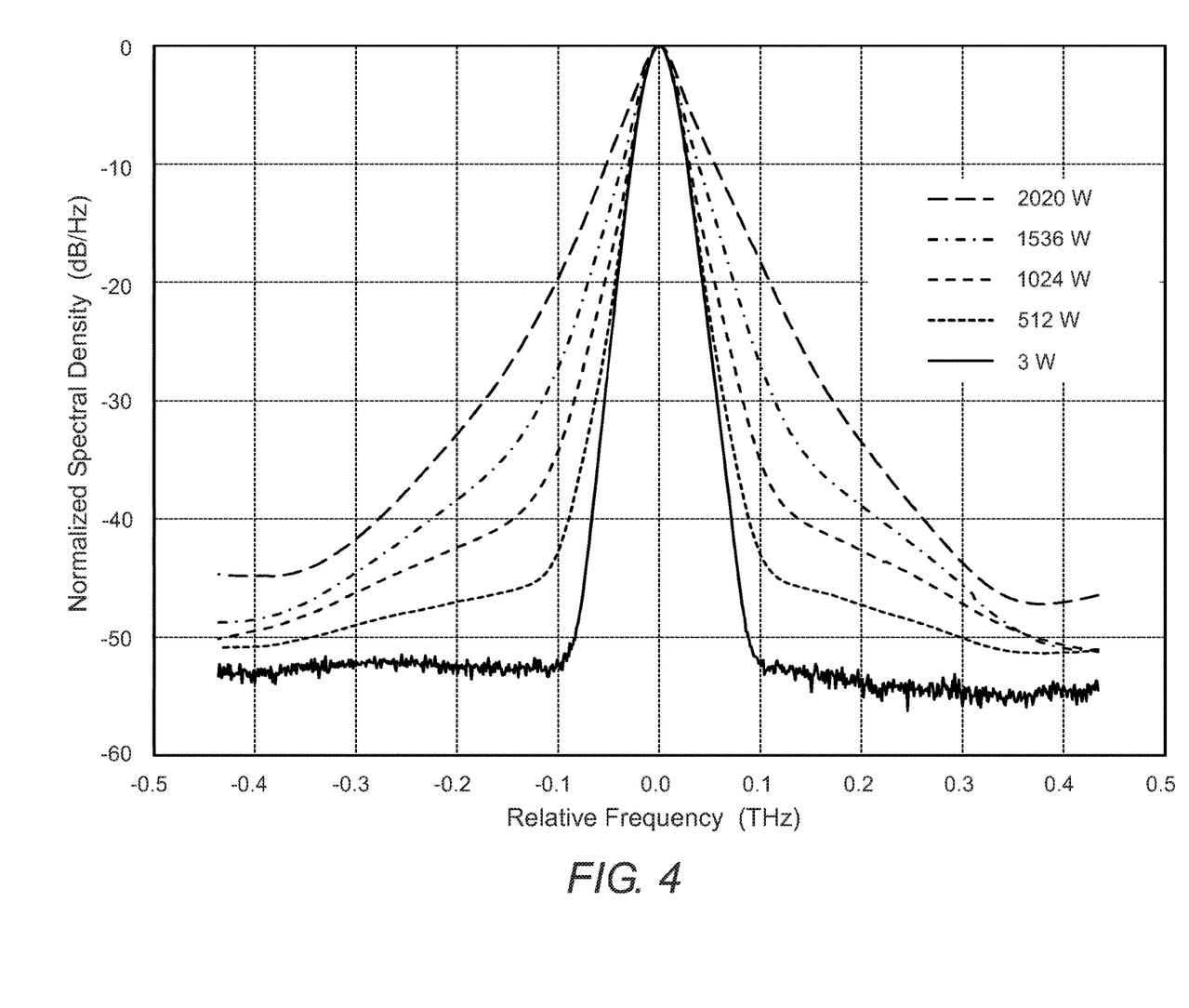
FIG. 4 is a graph schematically illustrating normalized spectral density vs. relative frequency for an amplified laser beam from a fiber power-amplifier that was seeded with a depolarized laser beam directly from the polarization combiner in an example of the optical apparatus of FIG. 3D.

FIG. 4 is a graph schematically illustrating normalized spectral density vs. frequency for an amplified laser beam at different output powers, with the fiber power-amplifier seeded directly by the recombined laser beam after polarization combiner 68. Second phase modulator 20 and optical fiber 34 of the present invention were omitted. Seed laser 12, first phase modulator 16, source 22, and polarizer 18 were the same as the exemplary apparatus described above, so FIG. 4 can be compared directly to FIG. 2. Significant spectral broadening occurs as the output power is increased. At 2050 W of output power, the spectral bandwidth at −3 dB was about 37 GHz in FIG. 4, compared to the essentially unbroadened spectral bandwidth of 27 GHz in FIG. 2. This comparison demonstrates the advantage of the present invention, which enables SBS suppression by depolarizing the laser beam, forming a truly unpolarized laser beam to seed subsequent amplifiers without spectral broadening. The rate of depolarization is independently controlled through the second phase modulator. The polarization scrambling rate can be set sufficiently high to suppress SBS, but still low enough to prevent undesirable spectral broadening due to SPM in subsequent amplifiers.

It should be noted that the inventive optical apparatus could be located between any two amplifiers in a chain of amplifiers in a fiber MOPA laser. However, it is generally favorable to depolarize the laser beam after the master oscillator and prior to any amplification. Then, all the amplifiers in the chain benefit from the SBS suppression provided by the unpolarized laser beam, enabling higher overall output powers. However, in a chain that includes polarization-maintaining components, the inventive apparatus would be located preferably after the last polarization-maintaining amplifier.

It should also be noted that although the inventive optical apparatus was applied to continuous-wave laser beams in the examples presented herein, the invention would also be useful to depolarize pulsed laser beams. The invention could spectrally broaden a laser beam having pulses that are much longer than the time corresponding to phase modulations induced by the spectral-broadening phase modulator. Similarly, the invention could depolarize a laser beam having pulses that are much longer than the time corresponding to the differential phase modulation induced by the polarization-scrambling phase modulator. The invention was successfully tested in a pulsed fiber MOPA laser having pulse durations of order tens of microseconds.

The present invention is described above in terms of a preferred embodiment and other embodiments. The invention is not limited, however, to the embodiments described and depicted herein. Rather, the invention is limited only by the claims appended hereto.

What is claimed is:

1. An optical apparatus for depolarizing a laser beam, comprising:
    a linear polarizer receiving the laser beam and transmitting a portion thereof that is linearly polarized;
    a polarization-scrambling phase modulator having fast and slow axes, the polarization-scrambling phase modulator driven by a random rapidly-modulated electrical signal from a source thereof;
    an optical coupler receiving the linearly-polarized laser beam, dividing the linearly-polarized laser beam into two polarization components having equal power, and separately delivering the two polarization components to the fast and slow axes of the polarization-scrambling phase modulator; and
    a birefringent element having fast and slow axes, the polarization component in the slow axis of the polarization-scrambling phase modulator coupled into the fast axis of the birefringent element and the polarization component in the fast axis of the polarization-scrambling phase modulator coupled into the slow axis of the birefringent element;
    wherein, the polarization-scrambling phase modulator produces a random differential phase modulation and a time delay between the two polarization components therein;
    wherein the birefringent element has a length selected to compensate for the time delay.

2. The optical apparatus of claim 1, wherein the optical coupler includes two polarization-maintaining optical fibers in series and joined together by a splice, the polarization-maintaining optical fibers each having orthogonal birefringent axes, the birefringent axes oriented at 45° with respect to each other at the splice.

3. The optical apparatus of claim 1, wherein the optical coupler includes a connection and a polarization-maintaining optical fiber, the connection located at the end of the polarization-maintaining optical fiber proximate to the linear polarizer, the polarization-maintaining optical fiber having orthogonal birefringent axes that are oriented at 45° with respect to optical axes of linear polarizer at the connection.

4. The optical apparatus of claim 1, wherein the optical coupler includes a connection and a polarization-maintaining optical fiber, the connection located at the end of the polarization-maintaining optical fiber proximate to the polarization-scrambling phase modulator, the polarization-maintaining optical fiber having orthogonal birefringent axes that are oriented at 45° with respect to the fast and slow axes of the polarization scrambling phase modulator.

5. The optical apparatus of claim 1, wherein the optical coupler includes a polarization-maintaining beam splitter, a short polarization-maintaining optical fiber in parallel with a long polarization-maintaining optical fiber, and a polarization combiner.

6. The optical apparatus of claim 5, wherein the optical coupler produces a relative time delay between the two polarization components, the relative time delay produced by the optical coupler is longer than a coherence time of the linearly-polarized laser beam.

7. The optical apparatus of claim 6, wherein the length of the birefringent element selected to also compensate for the relative time delay produced by the optical coupler.

8. The optical apparatus of claim 1, wherein the birefringent element is a polarization-maintaining optical fiber.

9. The optical apparatus of claim 1, wherein the birefringent element is a birefringent crystal.

10. The optical apparatus of claim 1, wherein the polarization-scrambling phase modulator and the birefringent element are identical, having polarization axes of respective electro-optic crystals therein mutually oriented at 90°.

11. The optical apparatus of claim 1, wherein the polarization-scrambling phase modulator includes an electro-optic crystal made of lithium niobate.

12. The optical apparatus of claim 1, wherein the polarization-scrambling phase modulator is driven by a white-noise signal.

13. The optical apparatus of claim 1, further including a spectral-broadening phase modulator that increases the spectral bandwidth of the laser beam before it is received by the linear polarizer.

14. The optical apparatus of claim 13, wherein a highest-frequency applied to the polarization-scrambling phase modulator is lower than a highest-frequency applied to the spectral-broadening phase modulator.

15. The optical apparatus of claim 13, wherein the spectral-broadening phase modulator includes an electro-optic crystal made of lithium niobate and is driven by a white-noise signal.

16. A MOPA laser, comprising:
    a seed laser providing a laser beam;
    a linear polarizer receiving the laser beam and transmitting a portion thereof that is linearly polarized;
    a polarization-scrambling phase modulator having fast and slow axes;
    an optical coupler receiving the linearly-polarized laser beam, dividing the linearly-polarized laser beam into two polarization components having equal power, and separately delivering the two polarization components to the fast and slow axes of polarization-scrambling phase modulator;
    a birefringent element having fast and slow axes, the polarization component in the slow axis of the polarization-scrambling phase modulator coupled into the fast axis of the birefringent element and the polarization component in the fast axis of the polarization-scrambling phase modulator coupled into the slow axis of the birefringent element; and
    an amplifier that does not have birefringence, the two polarization components delivered from the birefringent element to the amplifier, the amplifier generating an amplified laser beam;
    wherein, the polarization-scrambling phase modulator produces a differential phase modulation and a time delay between the two polarization components therein;
    wherein the birefringent element has a length selected to compensate for the time delay.

17. A method for depolarizing a laser beam, comprising the steps of:
    transmitting a portion of the laser beam that is linearly polarized through a linear polarizer;

dividing the linearly-polarized laser beam into two polarization components having equal power;
delivering the polarization components into different axes of a polarization-scrambling phase modulator having fast and slow axes;
driving the polarization-scrambling phase modulator with a random rapidly-modulated electrical signal that preferentially modulates one of the polarization components, thereby producing a random differential phase modulation between the polarization components;
coupling the polarization component in the slow axis of the polarization-scrambling phase modulator into a fast axis of a birefringent element; and
coupling the polarization component in the fast axis of the polarization-scrambling phase modulator into a slow axis of the birefringent element;
wherein, the polarization-scrambling phase modulator produces a time delay between the two polarization components therein and the birefringent element has a length selected to compensate for the time delay.

18. The method of claim 17, further including a step of spectrally broadening the laser beam prior to the transmitting step using a spectral-broadening phase modulator.

19. The method of claim 18, wherein a highest-frequency applied to the polarization-scrambling phase modulator is lower than a highest-frequency applied to the spectral-broadening phase modulator.

20. The method of claim 17, wherein the dividing and delivering steps produce a relative time delay between the two polarization components, the length of the birefringent element selected to also compensate for the relative time delay produced by the dividing and delivering steps.

* * * * *